Feb. 3, 1970  TEISUKE NAITO ET AL  3,493,473
PROCESS FOR PURIFYING CRUDE PYRIDINE BASES
Filed March 21, 1966
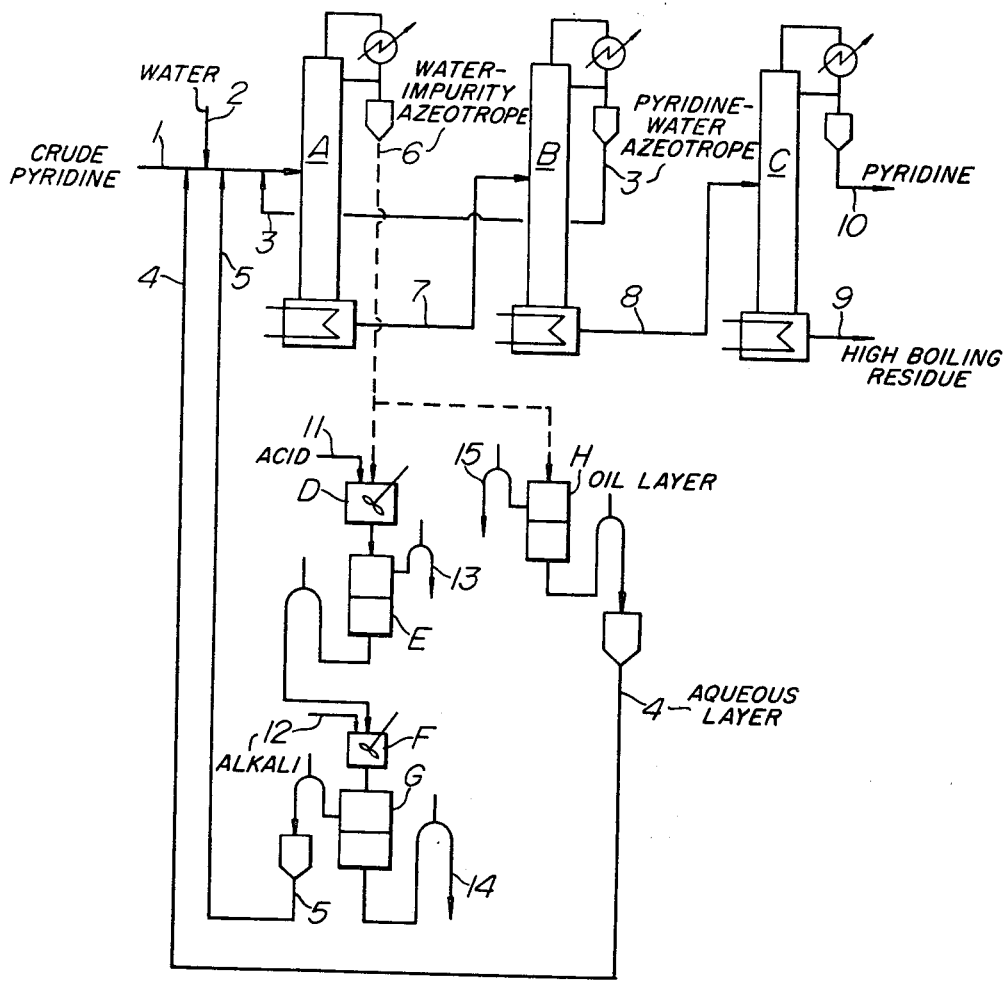
INVENTOR
TEISUKE NAITO
AKIRA TAMANO
YOSHIO KAWAI
BY Fisher, Christen, Sabol &
Caldwell
ATTORNEY 3,493,473
PROCESS FOR PURIFYING CRUDE
PYRIDINE BASES
Teisuke Naito, Akira Tamano, and Yoshio Kawai, Niigata, Japan, assignors to Japan Gas-Chemical Company, Inc., Tokyo, Japan, a corporation of Japan
Filed Mar. 21, 1966, Ser. No. 535,998
Claims priority, application Japan, Mar. 22, 1965, 40/16,630
Int. Cl. B01d 3/36
U.S. Cl. 203—84                 5 Claims

ABSTRACT OF THE DISCLOSURE

A process for purifying crude pyridine bases which comprises rectifying the crude bases together with water to form an azeotropic mixture of the pyridine base and removing impurities contained in the pyridine bases to obtain a high purity pyridine which contains a very small quantity of permanganate reducible materials and is Ehrlich's reagent negative.

---

The present invention relates to a process for purifying crude pyridine bases.

Pyridine bases such as pyridine, picolines and the like contain many impurities in their crude products whether they are obtained from coal tar or by various methods of synthesis, and it is hardly possible even by any highly efficient rectifying operation to remove these impurities. Therefore, in order to purify them, there is employed, for example, a process wherein the corresponding amount of an acid such as sulfuric acid and water are added to them to form an acid salt thereof, which is transferred to an aqueous solution layer, and the non-basic oil layer thus separated is removed and said aqueous solution layer is then washed with a light oil and steam is blown into the layer to complete the removal of impurities.

The solution is neutralized with an alkali such as ammonia to form the pyridine bases which separate from the aqueous solution layer by the salting out action of a salt such as ammonium sulfate formed here and finally said pyridine bases are dehydrated and distilled. Such a process is not preferable from a commercial point of view, since it is complicated, as described above, and there is produced a large amount of by-products such as ammonium sulfate, which is inferior to ordinary ammonium sulfate owing to its color.

An object of the present invention is, therefore, to provide a simpler and improved process for purifying crude pyridine bases.

Another object of the invention is to provide a process for purifying crude pyridine bases by a rectification of the bases in the presence of water added thereto.

We have now found that it is possible to remove various impurities almost completely by adding water to crude pyridine bases in the rectification of the bases.

Originally pyridine, picolines and the like may form an azeotropic mixture with water, and the azetrope has a boiling point of about 95° C. While these impurities contained in the crude product have different boiling points, most of them form an azeotrope with water having a complex composition at a lower temperature than an azeotropic point of pyridine bases and water and thereby are distilled off, if water is added to them and the mixture is distilled. A small amount of the remaining impurities in the azeotropic distillation does not enter into the subsequently distilled azeotrope of pyridine bases and water or the subsequently distilled pyridine bases themselves but remains in the distillation residue as a high boiling still residue. Thus the distillate obtained in such a distillation of crude pyridine bases in the presence of water added thereto may be divided as follows:

*a*—Azeotropic fraction consisting of various impurities and water.
*b*—Azeotropic fraction consisting of the pure product and water.
*c*—Anhydrous pure product.
*d*—Still residue.

The smaller is the amount of water added, the less is the fraction *b* and the more is the fraction *c*. On the other hand, the larger is the amount of water added, the more is the fraction *b* and the less is the fraction *c*. If the amount of water added is extremely reduced so that water hardly remains after the azeotrope *a* consisting of different impurities and water has been distilled off, the fraction *b* will be hardly obtained and a larger amount of the fraction *c* will be obtained. However, the more the condition approaches this extreme, the greater is the tendency for the impurities to enter into fractions *b* and *c*. Particularly permanganate reducible impurities and Ehrlich's reagent positive impurities have such a tendency. It is therefore desirable to add such an amount of water as some quantity of the fraction *b* may be obtained. Even if the fraction *b* (an azeotropic fraction consisting of pyridine bases and water) is obtained, the fraction can be recycled to employ the water contained therein as a part of the water to be initially added. There is no need to apply such additional undesirable processes as dehydration or distillation to the fraction *b*, since recycling the fraction *b* in the distillation system produces only the complex azeotropic fraction *a*, and the fraction *c* and the high boiling still residue *d* all of which can easily be removed from the system. If water is reduced to such a degree as no or little fraction *b* may be obtained, the distilltaion operation will be more advantageous since no or little fraction *b* is recycled in the distillation system. Although such an operation may increase the tendency for impurities to enter into the product as described above, the operation may be carried out if the product is allowed to contain an increased amount of impurities for some purposes. Also the fraction *a* consisting of various impurities and water in most cases is condensed into two layers, that is, aqueous and oil layers. The greater part of impurities, particularly the greater part of permanganate reducible material, Ehrlich's reagent positive materials and the like, is present in the oil layer. The fraction *a* is separated by use of decantation, for example, into two such layers and substantially all of impurities are taken as the oil layer out of the system, while the aqueous layer is recycled in the system. Thus only the impurities fraction, the pure product fraction and the high boiling still residue are removed from the system, and the desired pure product can be recovered substantially without a loss. In some cases some quantity of the desired pyridine bases enters into the fraction *a* consisting of various impurities and water and forms an azeotrope. In such cases, the pure product can be recovered substantially without a loss if an acid and water are added to the fraction *a*, according to a known process, and the oil layer thus separated is removed, and the aqueous layer is neutralized with an alkali, and the pyridine bases thus salted out are isolated in a slightly wet state, and these bases are returned to the distillation system. The amount of the acid and alkali employed here may correspond to that of pyridine bases contained in the fraction $a$ and may be by far smaller than that required to treat all of the crude product according to the above-mentioned known process. Also such operations as washing with light oil, steam blowing and the like are unnecessary and no industrial difficulty is encountered.

In the process according to the present invention, the amount of water added to crude pyridine bases may be within the range from 5 to 50 percent by weight of the bases. Impurities, which can be removed by the process according to the present invention from crude pyridine bases, include benzene, toluene, o-, m- and p-xylenes, methacrylonitrile, isobutyronitrile, dimethylaminoacetonitrile and/or the like as well as permanganate reducible materials and Ehrlich's reagent positive materials.

In the process of the present invention, the rectification may be carried out at a temperature of about 71° C. to about 144° C.

The accompanying drawing shows one embodiment of the present invention.

With reference to the drawings, the starting material 1, a crude pyridine base, is charged together with water 2 added thereto into a distillation tower A for separating an azeotrope fraction 6 consisting of various impurities and water from the starting material. The bottom 7 from the tower A is charged into a distillation tower B, where an azeotrope 3 consisting of the pyridine base and water is separated from said bottom 7. And the bottom 8 from the tower B is charged into a distillation tower C, where pure product 10 is distilled off and a high boiling residue 9 is removed as a bottom. For above-mentioned fractions $a$, $b$, $c$ and $d$ corresponds to 6, 3, 10 and 9 here respectively. Fraction 3 is returned to the starting material 1 charge system so that water contained therein may serve as part of water to be added to the starting material. If the desired degree of purity of the product is lower for the object, the amount of water 2 added may be reduced and the bottom 7 from the tower A, which is recovered as a water-free component, may be charged directly into the tower C omitting the tower B. If the distillate 6 from the tower A contains some quantity of pyridine bases, the pyridine bases can be recovered by returning the distillate 6 as water containing pyridine bases to the starting material 1 charge system through an acidification vessel D, where an acid 11 is added, a separator E for removing a non-basic oil layer 13 separated in the preceding acidification stage, a neutralization and salting out vessel F, where an alkali 12 is added, and a separator G for separating a water containing pyridine bases layer 5 and an aqueous solution of the salt 14 formed in the preceding neutralization and salting out stage so that water contained in said bases may serve as part of the water to be added to the starting material.

When the distillate 6 from the tower A is separated into an aqueous layer and an oil layer which contains substantially all of impurities, this separation may be carried out with a separator H, wherein an oil layer 15 and an aqueous layer 4 is obtained, and the aqueous layer 4 may be then recycled.

In some cases it is advantageous to mix water 2 or recycle liquids 3 to 5 with the starting material 1 before they are charged into the tower $a$, while in some other cases it is advantageous to charge them into a column differing from the charge column of the starting material 1. In either case the essential feature of the present invention characterized in that water is added to crude pyridine bases to be distilled will be never injured.

The following examples illustrate how the removal of impurities is effectively carried out by adding water to crude pyridine bases to be distilled according to the present invention.

Example 1

This example is the distillation of crude pyridine having such a composition as shown in Table 1 in the presence of water added thereto. The analysis of crude pyridine was mainly carried out by gas chromatography using a column packed with PEG–1000 impregnated kieselguhr. The components $X_1$ to $X_6$ in Table 1 are unknown materials. The ratio of the retention time of these materials to that of pyridine in the gas chromato gram is the $R_f$ value in the table. Values (percent) in the table are the contents of the materials determined from only the area ratio of the peaks. R-CN is an unknown material having the properties of a nitrile, and the $R_f$ value (that of pyridine is 1) and content thereof are indicated in the table. Also $B_z$, MAN, IBN, TOL, M.P.-X, o-X, $P_y$ and $\alpha$-$P_c$ represents benzene, methacrylonitrile, isobutyronitrile, toluene, m- and p-xylene, o-xylene, pyridine and $\alpha$-picoline respectively. Resid is a high boiling residuum. Further R-Comp represents permanganate reducible materials and the concentration of the materials is shown by milli-equivalents of potassium permanganate consumed per one gram of the sample. Permanganate reducible materials can be identified by using a method specified in JIS (Japanese Industrial Standard K8777 Nov. 10, 1959; revised Mar. 1, 1961) as follows:

If a red color is maintained when 0.1 ml. of $N/10$ potassium permanganate is added to 5 ml. of sample, permanganate reducible material is not present in the sample. P-Comp in the table represents Ehrlich's reagent positive materials, and the concentration of the materials in the table is that in terms of p.p.m. as pyrrole obtained by comparing the color obtained when the sample was reacted with p-dimethylaminobenzaldehyde under a hydrochloric acid condition at 50° C. for 25 minutes with the color obtained when a standard solution of pure pyrrole was subjected to the same treatment using a photoelectric colorimeter. Ehrlich's reagent positive materials are identified by the following method:

0.1 ml. of 12 N HCl solution containing 5% by weight paradimethylaminobenzaldehyde and 0.2 cc. 12 N HCl is added to the sample, and the method is added to the resulting mixture to make 10 ml. The mixture is maintained at 30° C. for 25 minutes and then is subjected to colorimetric determination. If the solution is colorless, the solution does not contain Ehrlich's reagent positive material, and the solution is Ehrlich's reagent negative.

TABLE 1

| Component: | $R_f$ | Percent by weight |
|---|---|---|
| $P_y$ | 1.00 | 98.27 |
| $\alpha$-$P_c$ | 1.25 | 0.676 |
| $X_1$ | 0.10 | 0.002 |
| $X_2$ | 0.123 | 0.001 |
| $X_3$ | 0.141 | 0.002 |
| $X_4$ | 0.152 | 0.047 |
| $X_5$ | 0.193 | 0.008 |
| $B_z$ | 0.223 | 0.116 |
| MAN | 0.27 | 0.015 |
| IBN | 0.325 | 0.049 |
| TOL | 0.384 | 0.238 |
| R-CN | 0.58 | 0.164 |
| M.P.-X | 0.68 | 0.265 |
| $X_6$ | 0.77 | 0.012 |
| o-X | 0.884 | 0.021 |
| Resid | | 0.107 |

R-Comp, 0.63 meq./g.
P-Comp, 330 p.p.m.

To 150 parts of this crude pyridine, 30 parts of water was added and the resultant mixture was rectified using a rectifying tower having about 50 theoretical plates. The fractions thus obtained and their composition are shown in Table 2.

TABLE 2

| Number: | Distillation temperature, °C | The nature and the amount of distillate, parts | Composition of distillate, percent | | | P-Comp, p.p.m. | R-Comp, meq./g. |
|---|---|---|---|---|---|---|---|
| | | | Pyridine | Water | Impurities | | |
| 1 | 71.4-94.2 | Upper layer, 1.5403 | 12.3 | Trace | ca. 87.7 | 2×10⁴ | 18.4 |
| | | Lower layer, 3.1924 | 8.45 | ca. 91.55 | Trace | 1.9×10² | 0.112 |
| 2 | 94.2-94.4 | Upper layer, 0.0920 | 31.1 | Trace | ca. 68.9 | 4.5×10³ | 13.9 |
| | | Lower layer, 0.8653 | 49.9 | ca. 50.1 | Trace | 1.2×10³ | 0.924 |
| 3 | 94.4-94.5 | Homogeneous layer, 69.0094 | 57.4 | 42.6 | 0 | 1.4×10² | 0.201 |
| 4 | 94.5-115.5 | Homogeneous layer, 2.8861 | 90.4 | 9.6 | 0 | 3.4×10 | 0.091 |
| 5 | 115.5 | Homogeneous layer, 103.3064 | 100 | 0 | 0 | 0 | 0.03 |
| | Still residue | Homogeneous layer, 1.7 | 31.0 | 0 | 69.0 | 3.4×10² | 1.58 |

In the above table, No. 1 is an azeotropic mixture consisting of impurities, pyridine and water, No. 3 an azeotrope of pyridine and water and No. 5 pure pyridine. No. 2 and No. 4 are intermediate fractions respectively between No. 1 and No. 3 and between No. 3 and No. 5. The quality of No. 5 fraction, pure pyridine, was found to correspond to that of extra grade pyridine reagent prescribed in Japan Industrial Standard JIS K8777.

Example 2

To 2,845 parts of the sum of respective halves of No. 1 and No. 2 fractions obtained in Example 1, about one part of concentrated sulfuric acid was added. The oil layer thus separated as an upper layer was removed. An acid aqueous layer was neutralized with about 0.8 part of caustic soda and 0.5995 part of aqueous pyridine (water content was 0.1405 part) was recovered as an upper layer. This was combined with 33.4478 parts of the sum of respective halves of No. 3 and No. 4 fractions (water content was 13.7753 parts). The resultant mixture corresponded to the recovered aqueous pyridine to be recycled in the distillation of 75 parts of crude pyridine and 15 parts of water in the same manner as in Example 1, and contained 20.1314 parts of pyridine and 13.9158 parts of water. To the above mixture 55 parts of crude pyridine and 1.0842 parts of water were then added and the mixture thus obtained was rectified in the same manner as in Example 1. From the fractions corresponding to No. 1 and No. 2 in Example 1, aqueous pyridine was recovered as described above, and the aqueous pyridine was combined with the fractions corresponding to No. 3 and No. 4 in Example 1. Further 55 parts of crude pyridine and replenished water was added to this mixture. Then the same rectificating operation was repeated so that the ratio of water to the sum of 55 parts of crude pyridine and pyridine contained in the recycle liquid may be always kept at a definite value. This operation was repeated seven times. Main fraction, that is, the fraction corresponding to No. 5 in Example 1 obtained in each run was of the same purity as a chemical reagent.

Example 3

This example is the distillation of crude β-picoline having such a composition as shown in Table 3 in the presence of water added thereto. The analysis of the crude β-picoline was carried out in the same manner as in Example 1. The symbol of each component in the table is also identical with that in Example 1, but additional symbols DMAN, 2,6-Lut, 2-Et-Py and β-Pc, represent dimethylaminoacetronitrile, 2,6-lutidine, 2-ethylpyridine and β-picoline respectively.

TABLE 3

| Component: | $R_f$ | Percent by weight |
|---|---|---|
| R-CN | 0.58 | 0.0124 |
| M.P.-X | 0.68 | 0.0540 |
| X₆ | 0.77 | 0.123 |
| o-X | 0.884 | 0.441 |
| Py | 1.00 | 0.246 |
| α-Pc | 1.25 | 1.072 |
| DMAN | 1.34 | 0.674 |
| 2,6-Lu | 1.49 | 1.787 |
| 2-Et-Py | 1.71 | 0.344 |
| β-Pc | 1.95 | 94.305 |
| Resid | | 0.921 |

R-Comp, 2.813 meq./g.
P-Comp, 1,348 p.p.m.

The rectifying tower and the operation employed in this example were identical with those in Example 1. 50 parts of the above-mentioned crude β-picoline and 10 parts of water were charged into the rectifying tower. Distillate thus obtained and their composition are shown in Table 4.

In Table 4, No. 1 fraction is an azeotropic mixture consisting mainly of impurities and water, No. 3 an azeotrope of β-picoline and water and No. 5 pure β-picoline. No. 2 and No. 4 are intermediate fractions respectively between No. 1 and No. 3 and between No. 3 and No. 5. This No. 5 fraction, pure β-picoline, was found to contain no impurity by gas chromatography and to be substantially or completely negative for Ehrlich's reagent and to contain as little permanganate reducible materials as chemical reagents.

TABLE 4

| Number: | Distillation temperature, °C | The nature and the amount of distillate (parts) | Composition of distillate, percent | | | P-Comp, p.p.m. | R-Comp, meq./g. |
|---|---|---|---|---|---|---|---|
| | | | β-picoline | Water | Impurities | | |
| 1 | 92.4-96.4 | 1.9042 | 11.40 | 2.70 | 85.90 | 2.4×10⁴ | 33.7 |
| | | 4.6858 | 0.53 | 98.10 | 1.37 | 5.2×10⁴ | 0.500 |
| 2 | 96.4-96.9 | 2.1995 | 32.64 | 60.45 | 6.91 | 8.1×10² | 4.49 |
| | | 1.0424 | 11.10 | 87.80 | 1.10 | 1.2×10² | 0.784 |
| 3 | 96.9 | 5.0725 | 32.02 | ca. 67.98 | Trace | 1.7×10² | 0.945 |
| 4 | 96.9-143.7 | 0.8696 | 59.10 | 22.20 | 18.70 | 2×10³ | 0.594 |
| 5 | 143.7 | 41.3449 | 100 | 0 | 0 | Trace | 0.063 |
| | Still residue | 1.70 | 27.1 | 0 | 72.9 | 2.3×10³ | 4.49 |

What we claim is:

1. A process for purifying crude pyridine bases containing at least one pyridine base selected from the group consisting of pyridine and picolines and further containing permanganate reducible and Ehrlich's reagent positive materials as impurities, which comprises: adding water to the crude bases, subjecting the resulting mixture to a first distillation step to separate an azeotropic fraction of said impurities and water as overhead; subjecting the bottoms from said first distillation step to a second distillation step to separate an azeotropic fraction consisting of the pyridine base and water as overhead; and subjecting the bottoms from said second distillation step to a third distillation step to separate said pyridine base as overhead of substantially 100% purity and containing only trace amounts of permanganate reducible and Ehrlich's reagent positive materials.

2. The process according to claim 1 wherein the overhead from the first distillation step is condensed to obtain two layers of oil and water and wherein said water layer and the overhead from the second distillation step are recycled to the first distillation step.

3. A process according to claim 1 wherein water is added in an amount of from 5 to 50 percent by weight of the crude bases.

4. A process according to claim 1 wherein said impurities include also a member selected from the group consisting of benzene, toluene, o-, m- and p-xylenes, methacrylonitrile, isobutyronitrile, dimethylaminoacetonitrile and mixtures thereof.

5. A process according to claim 1 wherein said purifying is carried out at a temperature of about 71° C. to about 144° C.

References Cited

UNITED STATES PATENTS

| | | | |
|---|---|---|---|
| 2,350,447 | 6/1944 | Cole et al. | 203—76 X |
| 2,363,157 | 11/1944 | Stasse | 260—293.2 X |
| 2,363,158 | 11/1944 | Stasse | 260—293.2 X |
| 2,425,220 | 8/1947 | Baney | 203—83 |
| 2,439,777 | 4/1948 | Lake et al. | 203—58 |
| 2,755,282 | 7/1956 | Hachmuth. | |
| 2,853,489 | 9/1958 | Moon | 260—293 X |
| 2,885,402 | 5/1959 | MacLean et al. | 260—293 X |
| 2,708,653 | 5/1955 | Sisco | 203—69 X |
| 2,717,232 | 9/1955 | Geller et al. | 203—14 X |

NORMAN YUDKOFF, Primary Examiner

F. E. DRUMMOND, Assistant Examiner

U.S. Cl. X.R.

203—85, 97; 260—290